(12) United States Patent
Melendez et al.

(10) Patent No.: US 6,525,396 B2
(45) Date of Patent: Feb. 25, 2003

(54) SELECTION OF MATERIALS AND DIMENSIONS FOR A MICRO-ELECTROMECHANICAL SWITCH FOR USE IN THE RF REGIME

(75) Inventors: Jose L. Melendez, Plano, TX (US); Byron Williams, Dallas, TX (US); Yu-Pei Chen, Plano, TX (US); Darius Crenshaw, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/836,519

(22) Filed: Apr. 17, 2001

(65) Prior Publication Data

US 2002/0195681 A1 Dec. 26, 2002

(51) Int. Cl.[7] .............................................. H01L 29/00
(52) U.S. Cl. ...................... 257/528; 257/415; 257/418; 257/532; 438/50; 438/53
(58) Field of Search ................................ 257/528, 415, 257/532, 619, 418; 333/262; 438/50, 53, 957, 329, 459, 977

(56) References Cited

U.S. PATENT DOCUMENTS

| | | | | |
|---|---|---|---|---|
| 5,479,042 A | * | 12/1995 | James et al. ............... | 257/532 |
| 5,578,976 A | * | 11/1996 | Yao ............................ | 333/262 |
| 5,638,946 A | * | 6/1997 | Zavracky .................... | 257/415 |
| 5,652,671 A | * | 7/1997 | Knipe et al. ............... | 359/291 |
| 5,880,921 A | * | 3/1999 | Tham et al. ................ | 257/418 |
| 6,040,611 A | * | 3/2000 | De Los Santos et al. ... | 257/415 |
| 6,046,659 A | * | 4/2000 | Loo et al. ................... | 333/262 |
| 6,153,839 A | * | 11/2000 | Zavracky et al. ........... | 257/418 |
| 6,218,911 B1 | * | 4/2001 | Kong et al. ................. | 333/262 |
| 6,307,169 B1 | * | 10/2001 | Sun et al. ................... | 257/415 |
| 6,307,452 B1 | * | 10/2001 | Sun ............................. | 257/418 |
| 6,373,007 B1 | * | 4/2002 | Calcatera et al. ........... | 200/181 |

* cited by examiner

*Primary Examiner*—David Nelms
*Assistant Examiner*—Andy Huynh
(74) *Attorney, Agent, or Firm*—W. Daniel Swayze, Jr.; W. James Brady; Frederick J. Telecky, Jr.

(57) ABSTRACT

The present invention provides an apparatus and method of selecting a unique combination of materials and dimensions for fabrication of a micro-electromechanical switch for improved RF switch performance. An electrode material is selected which exhibits a resistivity resulting in improved insertion loss for a predetermined switching speed, a dielectric material is selected which exhibits a permittivity resulting in improved isolation, and an airgap thickness is selected resulting in a pull-down voltage approximately equal to a supply voltage of the micro-electromechanical switch in which the isolation and predetermined switching speed are also functions of the airgap thickness.

7 Claims, 3 Drawing Sheets

| SPECIFICATIONS | CURRENT SWITCHES | INVENTIVE SWITCH |
|---|---|---|
| MAXIMUM INSERTION LOSS (dB) | 0.8 | 0.25 |
| MINIMAL ISOLATION (dB) | 11 | 30 |
| CONTROL VOLTAGE OR $V_p$ (V) | 3 | 4.5 |
| MAXIMUM SWITCHING TIME | 20 ns | 10 µs |
| POWER CONSUMPTION (W) | 0.6 | 0.6 |

FIG. 3

| PARAMETER | DEVICE PROPERTY | MATERIAL PROPERTY |
|---|---|---|
| INSERTION LOSS | $R_{on}$ | $\rho_{metal}$ |
| ISOLATION | $C_{on}/C_{off}$ | $\varepsilon_{dielectric}$ |
| CONTROL VOLTAGE | $V_p$ | $K_{metal}$ |
| SWITCHING TIME | V | $K_{metal}, m_{metal}$ |
| POWER CONSUMPTION | $R_{on}$ | $\rho_{metal}$ |

FIG. 4

\* THIN FILM PROPERTIES

| MATERIAL | RESISTIVITY ($\mu\Omega$ cm) | $E/(1-v^2)$ (GPa) |
|---|---|---|
| Ag | 1.6 | 83 |
| Cu | 1.7 | 140 |
| Au | 2.3 | 95 |
| PURE ALUMINUM | 2.65 | 78 |
| SPUTTERED Al2%Cu1%Si | 5.2* | --- |
| SPUTTERED Al1%Si | 3.9* | --- |
| SPUTTERED Al1%Si1%Ti | 8.3* | --- |
| PURE TUNGSTEN | 5.65 | 445 |
| EVAPORATED/SPUTTERED TUNGSTEN | 14-20* | --- |
| TiAl$_3$ | 17-22 | 102 |
| Si | 3-4 × 10$^6$ | 216 |

FIG. 5

| MATERIAL | $\varepsilon_{die}$ | DIELECTRIC STRENGTH (kV/mm) |
|---|---|---|
| $SiO_2$ | 3.9 | $10^3$ |
| $Si_3N_4$ | 7.5 | $10^3$ |
| $Al_2O_3$ (BULK) | 9.9 | 9.45 |
| $Ta_2O_5$ | 22 | $6 \times 10^2$ |
| $TiO_2$ (BULK) | 86 | 6.0 |
| STRONTIUM TITANATE | 350 | --- |
| BARIUM STRONTIUM TITANATE | 563 | --- |

SELECTION OF MATERIALS AND DIMENSIONS FOR A MICRO-ELECTROMECHANICAL SWITCH FOR USE IN THE RF REGIME

BACKGROUND OF THE INVENTION

1. Technical Field of the Invention

The present invention relates generally to the field of integrated circuits and, more particularly, to a method and system of selecting a unique combination of materials and dimensions for fabricating a micro-electromechanical switch device.

2. Description of Related Art

Rapid advances made in the field of telecommunications have been paced by improvements in the electronic devices and systems which make the transfer of information possible. Switches which allow the routing of electronic signals are important components in any communication system. Electrical switches are widely used in microwave circuits for many communication applications such as impedance matching, adjustable gain amplifiers, and signal routing and transmission. Current technology generally relies on solid state switches such as PIN diodes.

PIN diodes are typically fabricated in Si and GaAs. Often these devices are combined in series or shunt configurations to produce multipole-multithrow devices. Series configurations are used when minimum insertion loss is required over a broad frequency range. The shunt configuration is used when high isolation is required over a broad frequency range. This design also has better power handling. Multipole-multithrow switch can be fabricated with combinations of series and shunt diodes to take advantage of the benefits of each configuration. A figure of merit for the performance of a switch is given by the cutoff frequency:

$$f = 1/(2 \pi R_{on} C_{off}), \quad \text{Equation 1}$$

where $C_{off}$ is the capacitance of the device when no voltage is applied and $R_{on}$ is the resistance of the device with an applied voltage. Though the PIN diode is a popular RF switch, this device typically exhibits high power consumption and degradation at high frequencies. Furthermore, at high frequencies the figure of merit of the PIN switch decreases and results in an increased insertion loss and decreased isolation.

The technology of micro-machining offers a means of improving the increased insertion loss and decreased isolation at high frequencies as an alternative to PIN semiconductor electronic components. New structures, such as micro-machined electromechanical (MEM) switches, allow the design and functionality of integrated circuits to expand in a new dimension, creating an emerging technology with applications in a broad spectrum of technical fields.

An excellent example of a MEM switch is the drumhead capacitive switch structure which is fully described in U.S. Pat. No. 5,619,061. In brief, an input RF signal comes into the structure through one of the electrodes (bottom electrode or membrane electrode) and is transmitted to the other electrode when the membrane is in contact with the dielectric covering the bottom electrode.

The figure of merit for the above-described MEM switch is several times greater than Si PIN switches and is better than GaAs PIN switches. This is because the "on" resistance of the MEM switch is substantially due to the conductor resistance and is not dependent on contact and channel resistance of a PIN device resulting in low insertion loss of the MEM device. Further, the ratio of the "on" to "off" capacitance ($C_{on}/C_{off}$) determines how isolated the device is between poles in multipole devices. This can be tuned to the requirements of the application.

One of the limitations of this device is the switching speed. The RF MEM Switch switching speed is slow when compared to its PIN diode counterpart because of its relatively large inertia and the mechanical properties of the film. The pull-down voltage ($V_p$) or operating voltage is also larger for similar reasons. The challenge of making these devices is choosing the correct materials and the right dimensions to maximize the device performance for the particular application of interest. Uniquely fabricated MEM switches with improved switching speed offer an alternative to switching RF signals with low power consumption, low insertion loss and good isolation.

SUMMARY OF THE INVENTION

The present invention achieves technical advantages as an apparatus and method of selecting a unique combination of materials and dimensions for fabrication of a micro-electromechanical switch for improved RF switch performance. An electrode material is selected which exhibits a resistivity resulting in improved insertion loss performance for a predetermined switching speed requirement of the micro-electromechanical switch. A dielectric material is also selected which exhibits a permittivity resulting in improved isolation performance for the predetermined switching speed in which isolation is a function of the permittivity. Next, an airgap distance from a membrane electrode to a bottom electrode/dielectric surface is selected which results in a pull-down voltage approximately equal to a supply voltage of the micro-electromechanical switch in which the isolation, pull-down voltage, and switching speed are also all functions of the airgap thickness.

RF micro-electromechanical switches of the present invention are low power and only require power during the switching transient, are integrateable into current Si-CMOS technologies and exhibit little or no intermodulation distortion. Additionally, since the process for making RF micro-electromechanical switches only requires seven masks levels, it is more economical than the current GaAs switches.

BRIEF DESCRIPTION OF THE DRAWINGS

For a more complete understanding of the present invention, reference is made to the following detailed description taken in conjunction with the accompanying drawings wherein:

FIG. 3 shows a table of comparable switch specifications for cellular phone applications;

FIG. 4 shows a table of key device parameter for RF switch and the corresponding device and material property;

FIG. 5 shows a table of the resistivity and Young's modulus of several bulk and deposited materials;

DETAILED DESCRIPTION OF THE INVENTION

The numerous innovative teachings of the present applications will be described with particular reference to the presently preferred exemplary embodiments. However, it should be understood that this class of embodiments provides only a few examples of the many advantageous uses and innovative teachings herein. In general, statements made in the specification of the present application do not necessarily limit any of the various claimed inventions. Moreover, some statements may apply to some inventive features, but not to others.

Figure 1:
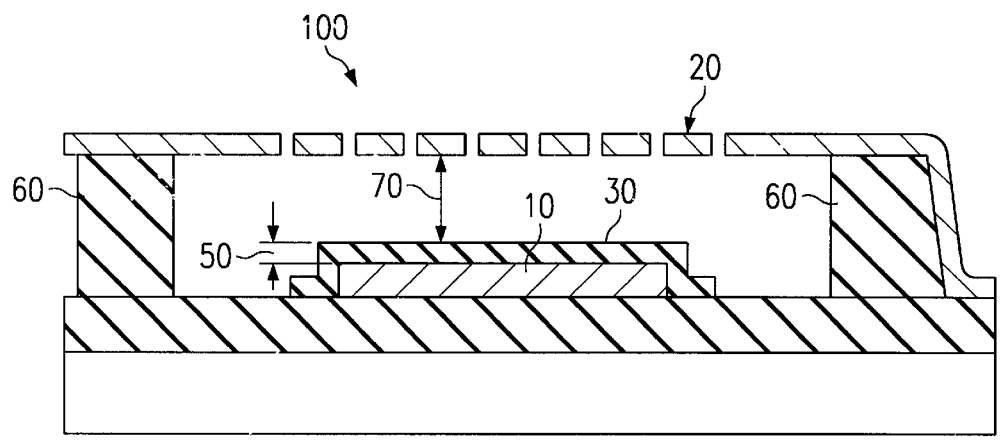
FIG. 1 illustrates a drumhead capacitive micro-electromechanical switch in an "off" state position.

Currently used MEM switches were developed with adequate electrical characteristics for use in the RF regime. An excellent example of such a device is the drumhead capacitive switch 100 illustrated in FIG. 1. The details of the MEM switch are set forth in U.S. Pat. No. 5,619,061, the disclosure of which is incorporated herein by reference.

In brief, an input RF signal enters into the structure through one of the electrodes (bottom electrode 10 or membrane electrode 20) and is transmitted to the other electrode when the movable membrane electrode 20 is in contact with a dielectric 30 covering the bottom electrode 10.

The membrane electrode 20 is movable through the application of a DC electrostatic field and is suspended across an insulating spacer 60. The insulating spacer 60 can be made of various materials such as photo-resist. Application of a DC potential between the membrane electrode 20 and the bottom electrode 10 causes the movable membrane to deflect downwards due to the electrostatic attraction between the electrodes.

Figure 2:
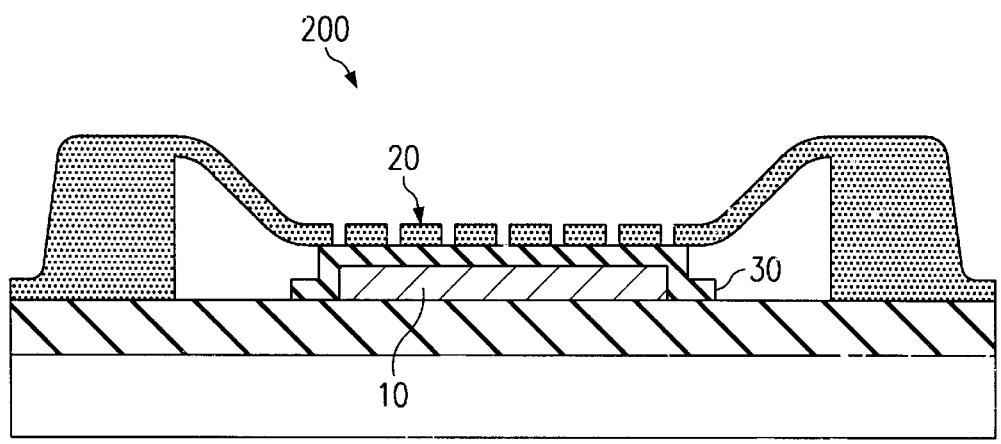
FIG. 2 illustrates the drumhead capacitive micro-electromechanical switch in an "on" state position.

Referring now to FIG. 2 there is illustrated a drumhead switch 200 in the "on" position (membrane 20 down), the membrane electrode 20 is electrostatically deflected to rest atop the dielectric 30, and is capacitively coupled to the bottom electrode. The on-off capacitance ratio is given by:

$$C_{on}/C_{off} 1 \approx +\epsilon_{die} D_{air}/\epsilon_{air} D_{die}, \qquad \text{Equation 2}$$

where $\epsilon_{die}$ is the dielectric constant of the dielectric covering the bottom electrode, $\epsilon_{air}$ is the dielectric constant of the airgap and $D_{die}$ is the thickness of the dielectric, and $D_{air}$ is the thickness of the airgap. Improved isolation ($C_{on}/C_{off}$) is possible by the proper material choices and proper scaling of device dimensions in accordance with the present invention.

A single MEM switch operates as a single-pole single-throw switch. However, switch applications used in microwave system for directing signals and/or power flow, for example, frequently require a single-pole multi-throw or multi-pole multi-throw switch placed in circuit with other components such as resistors, capacitors, inductors and/or other switches.

An example of a RF switch application is in cellular phone technology. In a cellular phone, a RF switch is used between the receive and transmit portions of a transceiver. A RF MEM switch utilizing a unique set of materials and dimensions, in accordance with the present invention, produces improved RF switch performance meeting or exceeding requirements for effective cellular phone applications. Switch specifications are compared in the table shown in FIG. 3. As shown, the switching speed of the RF MEM switch is slower than current switches but is fast enough for cellular phone applications. Additionally, the control voltage of the RF MEM switch is approximately 50% higher than current switches but is still within the requirements for effective cellular phone applications.

In order to produce a RF MEMS switch with a low insertion loss, low power consumption during operation, low control voltage, fast switching time, and high isolation, unique choices of material and device structure is required. These improved performance values are achieved in accordance with the present invention by utilizing materials that produce a low $R_{on}$, high restoring forces, low inertia, and high $C_{on}/C_{off}$. These relations are summarized in the table shown in FIG. 4.

More particularly, in order to produce low insertion loss and power consumption, a low $R_{on}=R$ (membrane-bottom) is required which is calculated by:

$$InsertionLoss \propto 10 Log \left[ \frac{R_{transmission\,line} + R_{membrane-bottom electrode}}{R_{transmission\,line}} \right] \qquad \text{Equation 3}$$

As can bee seen, the electrode materials that have a low resistivity are used for the top membrane and bottom electrode. A list of resistive materials that are used, for membrane and bottom electrodes is given in the table shown in FIG. 5.

Sputtered Al1%Si2%Ti is currently used as the bottom electrode and Sputtered Al2%Si is used for the top membrane. The addition of Ti to the bottom electrode slightly increases the resistivity but aids in suppressing hillcock formation.

The following equation defines the preferred isolation requirements in accordance with the present invention:

$$Isolation \propto 10 Log \left[ \frac{C_{on}}{C_{off}} \right] = 10 Log \left[ 1 + \frac{\epsilon_{die} D_{air}}{\epsilon_{air} D_{die}} \right], \qquad \text{Equation 4}$$

which shows that achieving high isolation requires dielectrics with large permittivities ($\epsilon_{die}$) and a device structure with a large $D_{air}$ and a small $D_{die}$. The permittivities of several dielectrics of interest are listed in the table shown in FIG. 6.

In a one embodiment $Ta_2O_5$ is used because of its high permittivity and stability although other fluids with similar characteristics could be used. Though there are dielectrics with larger permittivities, corresponding lower breakdown voltages prohibit their use because breakdown voltage restricts the minimum thickness of the dielectric that can be used. Furthermore, Strontium Titanate and Barium Strontium Titanate, require high deposition and post-deposition temperature processing prohibits use as a capacitor dielectric, because destructive hillock type formation occurs in Al at temperatures above approximately 400° C.

Regarding a preferred pull-down voltage characteristic, the thickness of the airgap ($D_{air}$) should be as large as possible to produce a large $C_{on}/C_{off}$. However, limitations are placed on the thickness of the airgap in order to maintain membrane pull-down voltages near the supply voltage. The relationship between pull-down voltage ($V_p$) and airgap, in accordance with the present invention, is defined as:

$$V_p = \sqrt{\frac{8K(g_0 + P/K)^3}{27\varepsilon_{air}}}$$ Equation 5 where $g_0$ is the zero voltage distance of the top membrane to bottom electrode/dielectric surface ($D_{air}$@V=0), P is the load placed on the membrane, and $\varepsilon_{air}$ is the dielectric constant of the airgap. $V_p$ is also determined by spring constant K. For a clamped circular plate, K is defined as:

$$\frac{16Et^3}{3a^4(1-v^2)} + \frac{4\sigma t}{a^2}$$ Equation 6 where E is the Young's modulus, t is the thickness of the membrane, v is the Poisson's ratio, σ is the residual biaxial stress in the membrane, and α is radius of the top membrane. Metals with a low $E/(1-v^2)$ are preferred in order to maintain small pull-down voltages. In a preferred embodiment, Al1%Si is used, because of its low Young's modulus, low Poisson ratio, low resistivity and flexibility, as the bottom and top electrode. In another embodiment, $TiAl_3$ is used for the membrane because its high yield strength improves device reliability.

For fast switching speed devices, membranes need to be low mass and modulus for switching from off to on and then low mass and high modulus for switching from on to off. Intermediate modulus material is used in a preferred embodiment. The on to off switching speed, in accordance with the preferred embodiment, is calculated by:

$$v_{membrane} = \left(\left[\frac{2g_0}{m}\left\{KD_{air} - \frac{\varepsilon_{die}AV_p}{2D_{die}^2}\right\}\right]\right)^{1/2}$$ Equation 7 where m is the mass and A is the bottom electrode area 30.

The corresponding switching time is several orders of magnitude larger than PIN switches but is lower than the minimal required GSM specification of 17 μsec.

Optimizing insertion loss and isolation, and iterating the results to obtain pull-down voltages near required specified values (per application), in accordance with the present application, can be implemented in software.

Figures 6, 7:
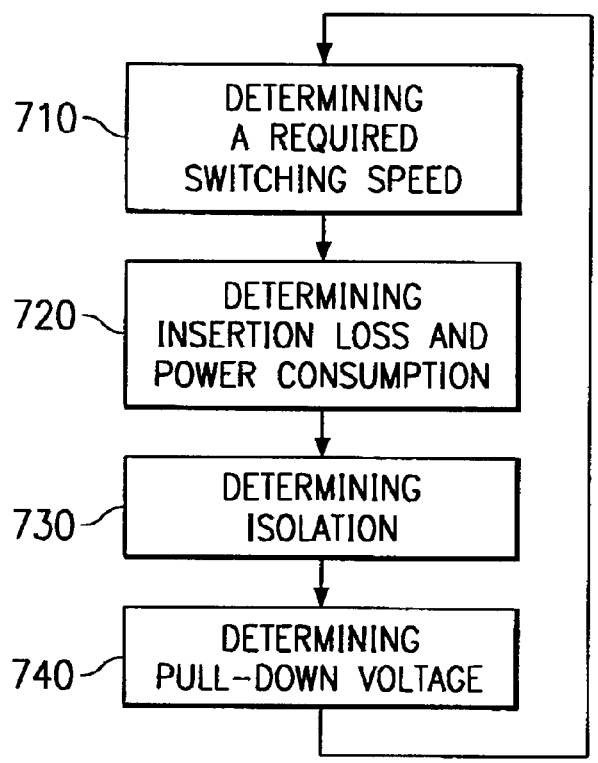
FIG. 6 shows a table of permittivity ratios and dielectric strengths of several dielectrics.
FIG. 7 illustrates a method of selecting properties and dimensions to maximize a MEM switch performance as a RF switch.

Referring now to FIG. 7 there is illustrated a method of selecting a combination of material and switch dimension to maximize a MEM switch performance as an RF switch. In a first act 710, a predetermined switching speed requirement is selected for specific application. Additionally, for improved switching speed devices, the MEM membranes need to be low mass and modulus for switching from on to off but low mass and high modulus for switching from off to on. Therefore, an intermediate modulus material is selected in a preferred embodiment. The switching speed is calculated, in accordance with a preferred embodiment, by Equation (7) as above-described. For example, a minimum switching speed is selected from standardized specification for cellular phone applications in which an RF switch is used between the receive and transmit portions of a transceiver.

In order to produce a RF MEM switch with a low insertion loss, low power consumption, low control voltage, and high isolation for a predetermined switch speed, a unique choice of materials and device structure is required. Specifically, in order to determine low insertion and power consumption 720, a low $R_{on}=R_{membrane-bottom}$ is chosen for the top membrane 20 and/or bottom electrode 10 per Equation (3) as above-described. Other material components, such as Ti, can be included as a small percentage of the material to aid in suppressing hillcock formation. Next, to determine a maximized isolation 730, dielectrics with large permittivities and a device structure with a large $D_{air}$ and a small $D_{die}$ mare chosen per Equation (4) as above-described. Additionally, high temperature processing and low breakdown voltage characteristics can prohibit use of some dielectric despite having large permittivity values.

To determine a maximum pull-down voltage characteristic 740, limitation are further placed on the thickness of the airgap in order to maintain membrane pull-down voltages near the supply voltage, however, the airgap needs to be as large as possible to produce a large $C_{on}/C_{off}$. The relationship between pull-down voltage and airgap in a preferred embodiment, is defined by Equation (5) and (6) as above-described. This selection process can be reiterated by repeating act 710 with a modification to materials and structure that maintain the switching speed specification. For example, if the pull down voltage 740 is determined to be too high, it can be lowered by changing the thickness of the membrane or the height of the membrane above the dielectric, for example, in accordance to maintaining the predetermined switching speed.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A micro-electromechanical switch used as a RF switch, comprising:

an electrode fabricated from a electrode material having a resistivity resulting in a predetermined switching speed;

a dielectric contact fabricated from a dielectric material having a permittivity resulting in said predetermined switching speed; and said micro-electromechanical switch having an airgap thickness to result in a pull-down voltage approximately equal to a supply voltage of said micro-electromechanical switch.

2. The micro-electromechanical switch of claim 1, wherein insertion loss is defined by:

$$InsertionLoss \propto 10Log\left[\frac{R_{transmission\,line} + R_{electrode}}{R_{transmission\,line}}\right],$$

wherein $R_{electrode}$ represents a resistance of said electrode material and $R_{transmission\,line}$ represents a resistance of a corresponding transmission line.

3. The micro-electromechanical switch of claim 2, wherein said isolation is defined by:

$$Isolation \propto 10Log\left[\frac{C_{on}}{C_{off}}\right] = 10Log\left[1 + \frac{\varepsilon_{die}D_{air}}{\varepsilon_{air}D_{die}}\right],$$

wherein $C_{on}/C_{off}$ is a ratio of on to off capacitance, $\varepsilon_{die}$ is a permittivity of said dielectric material, $\varepsilon_{air}$ is a dielectric constant of said airgap, $D_{die}$ is a measure of the thickness of said dielectric material, and $D_{air}$ is a measure of the thickness of said airgap.

4. The micro-electromechancial switch of claim 1, wherein said pull-down voltage is defined by:

$$V_p = \sqrt{\frac{8(K(g_0 + P/K))^3}{27\varepsilon_{air}}},$$

wherein $g_0$ is a zero voltage distance of a membrane electrode to a bottom electrode/dielectric surface, P is the load on said membrane electrode, $\in_{air}$ is a dielectric constant of said airgap, and K is defined by:

$$\frac{16Et^3}{3a^4(1-v^2)} + \frac{4\sigma t}{a^2},$$

where E is Young's modulus, t is a measure of a thickness of said membrane electrode, $v$ is Poisson's ratio, $\sigma$ is a residual biaxial stress in said membrane electrode, and 60 is a radius of said membrane electrode.

5. The micro-electromechanical switch of claim 1, wherein said predetermined switching speed is defined by:

$$v_{membrane} = \left\{ \left[ \frac{2g_0}{m} \left\{ KD_{air} - \frac{\varepsilon_{die} A V_p}{2D_{die}^2} \right\} \right] \right\}^{1/2}$$

wherein $g_0$ is a zero voltage distance of a membrane electrode to a bottom electrode/dielectric, surface, m is a mass, A is an area of the bottom electrode/dielectric $V_p$ is said pull-down voltage, K is a spring constant, $D_{air}$ is a measure of the thickness of said airgap, $D_{die}$ is a measure of thickness of said dielectric material, and $\in_{die}$ is a dielectric constant of said dielectric material.

6. The micro-electromechanical switch of claim 1, wherein said electrode material, dielectric material and airgap are determined from a software application.

7. The micro-electromechanical switch of claim 1, wherein said isolation, pull-down voltage, and predetermined switching speed are all functions of said determined airgap thickness.

* * * * *